United States Patent [19]

Krueger

[11] 4,022,385
[45] May 10, 1977

[54] WATER SPRAY NOZZLE

[75] Inventor: Robert A. Krueger, Mount Clemens, Mich.

[73] Assignee: Tri-Mark Metal Corporation, Detroit, Mich.

[22] Filed: Mar. 18, 1976

[21] Appl. No.: 668,320

[52] U.S. Cl. .................................. 239/592; 239/598
[51] Int. Cl.² ................................ B05B 1/04
[58] Field of Search ........... 239/592, 593, 594, 598, 239/599, 601

[56] References Cited
UNITED STATES PATENTS

| 2,188,116 | 1/1940 | Neale et al. ................. | 239/592 X |
| 2,868,228 | 1/1959 | Russell ........................ | 239/592 X |

*Primary Examiner*—Johnny D. Cherry
*Assistant Examiner*—Michael Mar
*Attorney, Agent, or Firm*—Barnes, Kisselle, Raisch & Choate

[57] ABSTRACT

A water spray nozzle for removing paint particles from air exhausted from a paint spray booth. The nozzle has an inlet and an outlet and at least two orifices therebetween which are of progressively diminishing size in a direction toward the outlet. The walls of the nozzle are designed to produce considerable turbulence of the water stream flowing through the nozzle and to produce a wide angle solid spray of water from the nozzle outlet.

17 Claims, 9 Drawing Figures

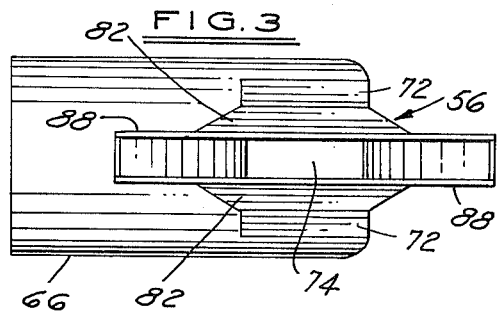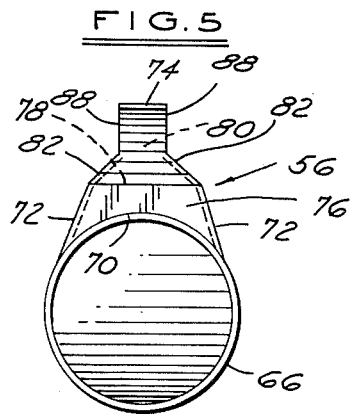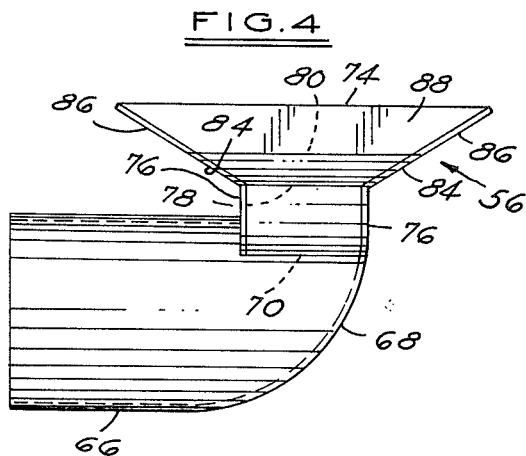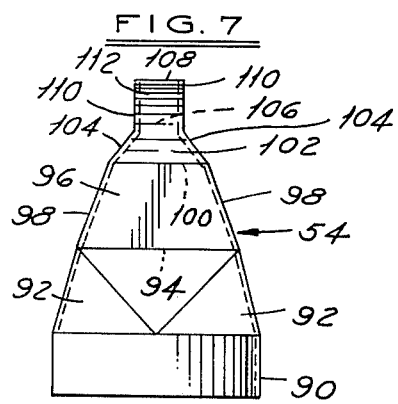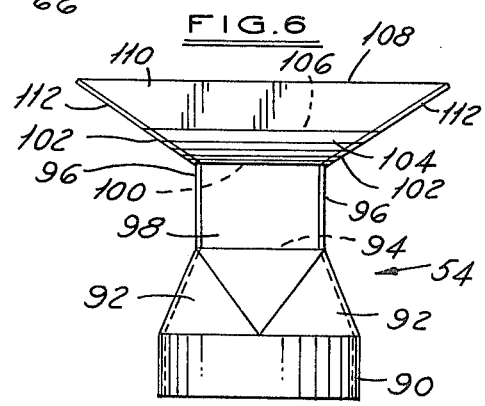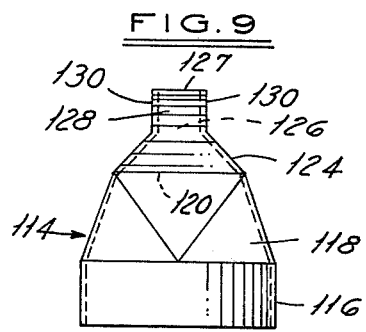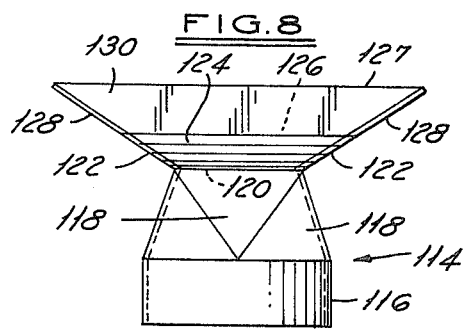

WATER SPRAY NOZZLE

This invention relates to a liquid spray nozzle and, more particularly, to a nozzle of the type used in an air exhaust duct for producing a solid fan-shaped stream of water or other liquid through which air laden with contaminant particles is directed to remove the contaminant particles therefrom.

In one type of commercially used paint spray booth, a high velocity air stream is directed through the booth so that the paint overspray is picked up by the air stream and directed into an exhaust duct having an outlet which normally exhausts the air to the outside atmosphere. Within the exhaust duct there is arranged a plurality of horizontally or vertically directed nozzles for producing a fan-shaped spray of water across the duct. The function of these nozzles is to entrain paint particles flowing with the air through the exhaust duct to the outside atmosphere.

Ideally, such nozzles should provide a continuous stream of water in the form of a fan-shaped solid sheet which extends across the air passageway in the exhaust dust and through which the paint-laden air is directed before exhausting into the outside atmosphere. In this manner the paint particles are entrained in the water spray gravitate to a sump where a paint sludge is separated from the water by any suitable means. In view of stringent requirements related to air pollution, the reduction in the amount of paint in the air discharging from the outlet of the exhaust passageway to a minimum is of prime importance. Nozzles heretofore used for this purpose have been inefficient with respect to the quantity of paint escaping from the outlet of the exhaust duct. They have been incapable of producing a wide angle spray in the form of a liquid stream.

It is an object of this invention to provide a nozzle of the type described, designed such that the spray issuing therefrom is in the form of a solid fanshaped liquid stream which is substantially uniform throughout its lateral extent.

A further object of the invention resides in a nozzle design which produces a uniform wide angle spray so that a minimum number of nozzles are required in an exhaust duct of a given size.

More specifically, the above-stated objects are achieved by incorporating in the nozzle at least two successive flow-restricting orifices between the nozzle inlet and the nozzle outlet. These orifices are shaped to produce substantial turbulence in the water stream flowing through the nozzle. The turbulence in the water stream is produced not only by the progressive restriction in the stream of water as it flows through the nozzle, but also by arranging the walls of the nozzle so that they abruptly change in direction at each orifice. I have determined that an even spread of a solid stream of water having a substantial width as it is discharged from the nozzle outlet is readily obtained by producing the aforementioned turbulence in the stream as it flows through the nozzle and prior to issuing from the outlet.

Other features and advantages of the invention will become apparent from the accompanying description and drawings, in which:

FIG. 3 is a view of one of the nozzles shown in FIG. 2 as viewed from the outlet end thereof;

FIG. 4 is a plan view of the nozzle shown in FIG. 3;

FIG. 5 is an end view of the nozzle shown in FIG. 4;

FIG. 6 is a plan view of another nozzle shown in FIG. 2;

FIG. 7 is an end view of the nozzle illustrated in FIG. 6;

FIG. 8 is a plan view of another nozzle embodying the present invention; and

FIG. 9 is an end view of the nozzle illustrated in FIG. 8.

Figure 1:
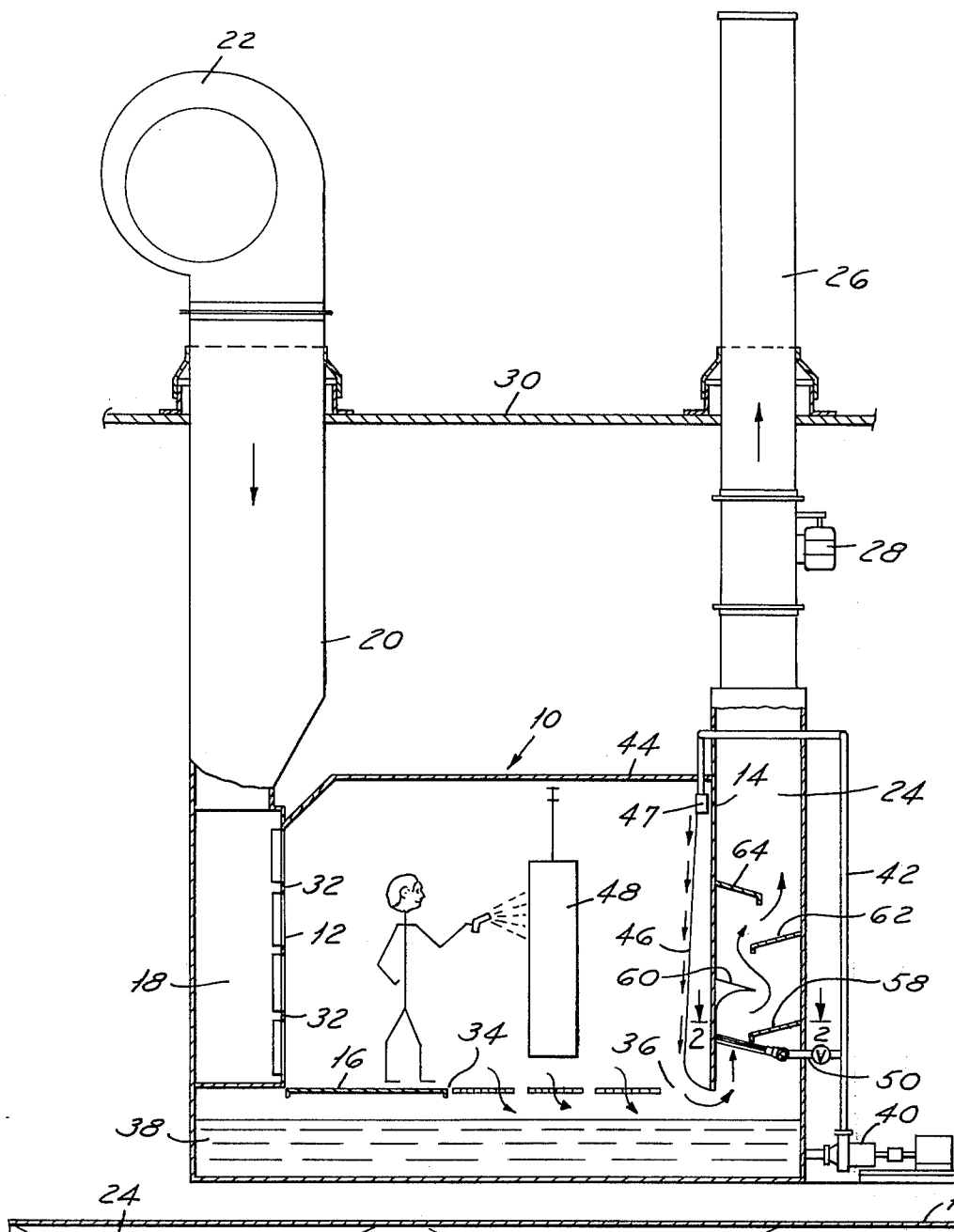
FIG. 1 is a somewhat diagrammatic view, partially in section, of a paint spray booth embodying the nozzle of this invention.

In FIG. 1 the paint spray booth 10 illustrated has side walls 12 and 14 and a bottom wall 16. Along side wall 12 of booth 10 there is an air chamber 18 communicating with the interior of the booth and connected to an air supply duct 20 through which air from the outside atmosphere is directed by a blower 22. Along the opposite side of booth 10, a second air chamber 24 is located which communicates with the interior of the booth and connects with the lower end of an exhaust duct 26. Within exhaust duct 26 there is arranged an exhaust fan (not illustrated) driven by a motor 28. Ducts 20,26 extend through the roof 30 of the structure in which the booth 10 is located. Thus, air from the outside atmosphere is blown into the spray booth through duct 20 and then exhausted back into the atmosphere through duct 26.

Side wall 12 is apertured as at 32 so that air flowing downwardly through inlet duct 20 is directed through chamber 18 into the interior of booth 10. The floor 16 of booth 10 is likewise apertured as at 34,36 so that the air directed into the spray booth through openings 32 flows across the spray booth, picks up paint particles from the overspray and is directed downwardly over the water sump 38 and then upwardly through chamber 24. Water from sump 38 or from any other suitable water source is directed by pump 40 upwardly through a conduit 42 and then downwardly through the top wall 44 of booth 10 as a waterfall 46 from a header 47. As is illustrated in FIG. 1, the paint spraying arrangement within booth 10 is such that the workpiece 48 to be sprayed is located adjacent waterfall 46 so that, as the operator sprays the workpiece, a substantial portion of the paint overspray is entrained in waterfall 46. Waterfall 46 drains into sump 38 through opening 36. Suitable apparatus is provided for separating the paint sludge from the water in sump 38. However, a substantial portion of the paint overspray in booth 10 is simply picked up by the air flowing through the booth which eventually flows upwardly through chamber 24 and exhaust duct 26.

Water conduit 42 from pump 40 is also connected by means of a bypass conduit 50 with a water header 52. Header 52 extends horizontally lengthwise in chamber 24. At regularly spaced points along the length thereof, header 52 is provided with a plurality of nozzles such as shown at 54,56 nozzle 56 being an end nozzle and nozzle 54 being one of the nozzle intermediate the ends of header 52. Directly above nozzles 54,56 there is arranged in chamber 24 a horizontally extending baffle 58. Baffle 58 extends generally horizontally approximately halfway across the width dimension of chamber 24. Additional baffles 60,62,64 are arranged in chamber 24 and are spaced vertically above baffle 58 so as to cause the air flowing upwardly through chamber 24 to travel a circuitous path.

Figure 2:
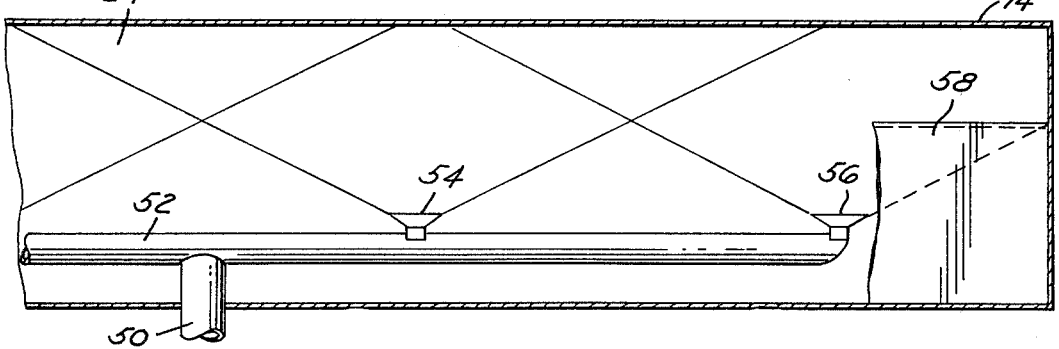
FIG. 2 is a sectional view taken along the line 2—2 in FIG. 1.

The arrangement thus far described and illustrated in FIGS. 1 and 2 is generally conventional. The present invention is specifically directed to the configuration and construction of nozzles 54,56.

The end nozzle 56 shown in FIG. 2 is illustrated in detail in FIGS. 3, 4 and 5. Nozzle 56 is mounted on an adapter sleeve 66 which corresponds in diameter with header 52 and which is adapted to be connected to one end of header 52. As is illustrated in the drawings, the nozzles are arranged to direct a spray of water in a generally horizontal direction across chamber 24. Thus, with respect to nozzle 56, one end of sleeve 66 is closed as at 68 and nozzle 56 is mounted on the cylindrical wall of sleeve 66 as shown in FIGS. 4 and 5. The opening at the junction of sleeve 66 and nozzle 56 forms an inlet 70 for the nozzle. Inlet 70 is of rectangular shape and is defined by the juction of the cylindrical wall of sleeve 66 with top and bottom walls 72 and a pair of side walls 76. Walls 72 extend generally tangentially from the periphery of sleeve 66 and converge toward each other in a direction toward the outlet 74 of the nozzle. Side walls 76 are perpendicular to top and bottom walls 72. Since walls 76 are parallel and walls 72 converge, it follows that the passageway through the nozzle is progressively constricted from inlet 70 to a first orifice designated 78. Orifice 78 is of rectangular shape and is of less area than inlet 70.

Nozzle 56 has a second orifice 80 which is located downstream of orifice 78. Between orifice 78 and orifice 80 top and bottom walls of the nozzle converge toward each other at a greater angle as indicated at 82 in FIG. 5 and the side walls diverge as indicated at 84 in FIG. 4. In the embodiment illustrated walls 84 diverge at an angle of about 120° relative to one another. I have determined that the angle of divergence between these walls should be at least 90°. However, I have also determined that orifice 80 must be of smaller cross section than orifice 78 in order to achieve the turbulence and the type of flow required to produce the most efficient spray pattern from the outlet 74. Since orifice 80 is smaller than orifice 78, even though the side walls diverge as at 84, it follows that the nozzle passageway between these two orifices is relatively short rather than a long tapering one. Likewise, since orifice 80 is of smaller area than orifice 78 and since 78 is smaller than inlet 70, it follows that the velocity of the water stream progressively increases as it flows from inlet 70 to orifice 80. It will also be observed that there is an abrupt change in direction as the water flows along walls 76 and 84 and along walls 72 and 82. The combination of these two factors, namely, the progressive restriction and the abrupt change in the direction of flow, produces considerable turbulence in the water stream as it flows through the nozzle. As distinguished from aerodynamic flow, this turbulence is not only desirable, but essential in order to obtain an even spread of the water as a solid stream across outlet 74 of the nozzle.

The portion of the nozzle between orifice 80 and outlet 74 comprises a stabilizing section. The side walls 86 merely form a linear continuation of the diverging walls 84 and the top and bottom walls 88 are spaced apart vertically in parallel relation. The spacing between walls 88 corresponds to the vertical dimension of orifice 80. I have determined that, in connection with paint spray booths of the type described, the vertical spacing between walls 88 should be at least about ⅜ and preferably about ⅝. When walls 88 are spaced apart at least this extent the turbulence of the stream renders the nozzle self-cleaning. If the shape of the nozzle is not such as to create considerable turbulence in the water stream flowing thereto and if the spacing between walls 88 is too narrow, paint sludge in the water stream will tend to accumulate in the nozzle. Paint accumulation in the nozzle is also minimized by having smooth, flat interior walls. I have also determined that in order to stabilize the fan-shaped stream of water issuing from outlet 74 in a generally horizontal plane the length of walls 88 in the direction of flow through the nozzle should be at least equal to the vertical spacing between walls 88.

The nozzle shown in FIGS. 6 and 7 produces the same type of spray as the nozzle illustrated in FIGS. 3 to 5. Nozzle 54 is adapted to be connected header 52 at a portion of the header intermediate its ends. Thus, nozzle 54 is mounted on a circular adapter portion 90 which defines the inlet of the nozzle. A plurality of bent wall portions 92 converge toward one another in a direction away from inlet 90 to define a first rectangular orifice 94 of smaller area than inlet 90. Downstream of orifice 94 nozzle 54 comprises a passageway of rectangular cross section which is defined by a pair of parallel opposite side walls 96 and a pair of converging top and bottom walls 98. Converging walls 98 and walls 96 terminate in a second rectangular orifice 100 in the nozzle. Since top and bottom walls 98 converge as shown in FIG. 7, it follows that orifice 100 is of less area than orifice 94. At orifice 100 the nozzle side walls diverge as at 102 in a manner similar to side walls 84 of nozzle 56, and the top and bottom walls converge as at 104 to define a third rectangular orifice 106. The angles of inclination of walls 102,104 relative to each other and the distance between orifices 100,106 are related such that orifice 106 is smaller than orifice 100. Thus, since orifice 106 is smaller than orifice 100, it follows that the portion of the nozzle passageway between these two orifices is relatively short in length rather than defining a long tapering passageway.

Between orifice 106 and the outlet 108 of the nozzle the top and bottom walls 110 are spaced apart vertically in parallel relation and the side walls 112 merely form linear extensions of side walls 102. This outlet section of nozzle 54 merely comprises a stabilizing section similar in shape and function to the section of nozzle 56 defined by walls 86,88.

The primary difference between nozzles 56 and 54 resides in the face that nozzle 56 is provided with two progressively decreasing orifices 78,80 between inlet 20 and outlet 74, whereas in nozzle 54 there are three progressively smaller orifices 94,100,106 between inlet 90 and outlet 108. However, both of these nozzles incorporate at least two successive orifices of progressively decreasing size and the passageway through the nozzle is defined by wall sections which change abruptly in direction at each orifice. As pointed out above, I have determined that these features are essential to the production of a fan-shpaed solid stream of water at the outlet of the nozzle. It is also essential that the orifice next adjacent the outlet is of rectangular shape.

In FIGS. 8 and 9 there is illustrated another nozzle 114 which may be used in place of the nozzle illustrated in FIGS. 6 and 7 intermediate the ends of header 52. As is the case with nozzle 54, nozzle 114 is mounted on a circular adapter portion 116 which forms the inlet of the nozzle. A plurality of bent walls 118 converge toward one another in a direction away from inlet 116 to define a first orifice 120. Orifice 120 is of rectangular shape and, in view of the converging walls 118, is obviously smaller in area than inlet 116. At orifice 120 the side walls of the nozzle diverge as at 122 and the top and bottom walls converge as at 124 to define a second orifice 126. In accordance with the invention, orifice 126 is dimensioned so that its area is less than orifice 120. For the same reasons as pointed out above, the length of the nozzle passageway between orifice 120 and orifice 126 is relatively short. Beyond orifice 126 the nozzle walls simply form a spray stabilizing section adjacent outlet 127. Thus, the side walls 128 merely form linear continuations of the diverging side walls 122 and the top and bottom walls 130 are spaced apart vetically in parallel relation. This stabilizing section of the nozzle is shaped, dimensioned and functions in the same manner as the stabilizing section of the two nozzles previously described.

The nozzles described herein are shown as weldments wherein the top and bottom walls generally continuous and simply bent to the proper inclination at each of the orifices. This is also true of the nozzle side walls illustrated. However, it will be appreciated that, if desired, the nozzle shown could be formed as castings. In any event, the junctions of the walls that are inclined to one another should be relatively sharp as distinguished from smoothly rounded, large radius curves. The sharp bends or inclinations between the walls assist materially in producing the desired turbulence in the water stream flowing through the nozzle and avoids a smooth aerodynamic type of flow where turbulence is maintained at a minimum.

Several design parameters of the nozzle which appear to produce the most efficient air cleaning spray have been determined. For example, it is preferred that the greatest restriction in the nozzle occur at the first orifice, that is, the orifice next adjacent the inlet. Thus, in a nozzle such as shown at 56 and 114 containing two restricting orifices the cross sectional area of the orifice adjacent the inlet is preferably not greater than about one-half the cross sectional area of the inlet and the cross sectional area of the orifice adjacent the outlet is preferably at least three-quarters the cross sectional area of the first orifice. In a nozzle such as illustrated at 54 containing three orifices the cross sectional area of the first orifice is preferably not greater than about 60% of the cross sectional area of the inlet; the cross sectional area of the second orifice is preferably at least about 60% of the cross sectional area of the first orifice and the cross sectional area of the third orifice is at least about 75% of the cross sectional area of the second orifice.

Likewise, in addition to the requirement that the side walls of the nozzle diverge outwardly toward the orifice adjacent the outlet at an angle of at least 90°, in order to obtain the desired turbulence it is preferred that the distances between successive orifice are maintained at predetermined maximum amounts. In general, it is preferred that the distance between two successive orifices is not greater than the smaller cross dimension of the downstream one of the two successive rectangular orifices. Preferably all of the restricting orifices in the nozzle are of generally rectangular cross section as illustrated.

In the foregoing description and the appended claims the terms "vertical", "horizontal", "top" and "bottom" are used merely to designate relative orientation. For example, where the nozzle extends horizontally in a vertical exhaust duct the top wall of the nozzle is on the downstream side of the exhaust duct and the bottom wall of the nozzle is on the upstream side of the exhaust duct. Thus, if the nozzle is mounted vertically in a horizontally extending portion of an exhaust duct the bottom wall referred to indicates the wall of the nozzle in an upstream direction and the top wall indicates the wall of the nozzle on the downstream side of the duct. Likewise, with respect to the nozzle itself, the term horizontal refers to the axis of the stream through the nozzle and the term vertical indicates a direction corresponding to the direction of air flow in the duct.

What is claimed is:

1. In an apparatus for removing contaminant particles from a stream of air, said apparatus being of the type wherein the contaminant-laden air is directed vertically through a horizontally directed water spray so that the contaminants are entrained in the water, a nozzle for producing a flat, fan-shaped solid stream of water, said nozzle having an inlet at one end adapted to be connected to a source of water under pressure, a horizontally elongated outlet at its opposite end from which the water is discharged as a flat fan-shaped solid stream and means defining a water passageway extending generally horizontally between said inlet and said outlet, said passageway including at least two successive flow restricting orifices between the inlet and the outlet, the first of said orifices being located upstream of the second orifice and being of smaller cross section than said inlet, the second orifice being disposed adjacent said outlet and being of smaller cross section than the first orifice and said outlet, said second orifice and said outlet being of rectangular shape in cross section, said passageway including a pair of opposite side walls disposed in generally vertical planes and extending between said first and second orifices, said side walls extending to said second orifice and flaring laterally outwardly from each other in the downstream direction with an included angle therebetween of at least 90°, said nozzle also having other walls extending between said first and second orifices which converge vertically toward each other in the downstream direction, the portion of the nozzle between said second orifice and said outlet being defined by a pair of flat opposite side walls diverging toward said outlet and flat top and bottom walls which are spaced vertically apart in parallel relation.

2. A nozzle as called for in claim 1 wherein the vertical spacing between said top and bottom walls corresponds to the vertical dimension of the second orifice.

3. A nozzle as called for in claim 2 wherein the last-mentioned side walls form linear extensions of the first-mentioned diverging side walls.

4. A nozzle called for in claim 3 wherein the dimension of said top and bottom walls in the direction of flow through the nozzle is equal to at least the vertical spacing therebetween.

5. A nozzle as called for in claim 4 wherein the vertical dimension of said outlet is at least about 3/8".

6. A nozzle as called for in claim 1 wherein each orifice is of rectangular shape and defined by two vertically spaced, horizontally extending edge portions and two horizontally spaced, vertically extending edge portions.

7. A nozzle as called for in claim 1 wherein all walls of said nozzle between said first orifice and said outlet are generally flat.

8. A nozzle as called for in claim 1 wherein said orifices are two in number and the cross sectional area of the first orifice is not greater than one-half the cross sectional area of the inlet.

9. A nozzle as called for in claim 8 wherein both said first and second orifices are of rectangular shape and are spaced apart along the axis of the passageway through the nozzle a distance not more than the smaller cross dimension of the first orifice.

10. A nozzle as called for in claim 9 wherein the first and second orifices are spaced apart a distance not greater than the vertical dimension of the second orifice.

11. A nozzle as called for in claim 1 including a third orifice in said passageway between said inlet and said first orifice, said third orifice having a cross section smaller than said inlet and larger than the first orifice.

12. A nozzle as called for in claim 11 wherein the cross sectional area of the three orifices are related such that the maximum restriction of the flow through the nozzle occurs at the third orifice.

13. A nozzle as called for in claim 11 wherein all of said orifices are of rectangular shape.

14. A nozzle as called for in claim 13 wherein the distances between the successive orifices is not greater than the smaller dimension of the upstream one of the orifices.

15. A nozzle as called for in claim 12 wherein the walls of said nozzle defining said passageway change abruptly in direction at each of said orifices so that a high degree of turbulence is created in the stream flowing therethrough.

16. A nozzle as called for in claim 1 wherein the walls of said nozzle defining said passageway change abruptly in direction at each of said orifices so that a high degree of turbulence is created in the stream flowing therethrough.

17. A nozzle as called for in claim 1 wherein said said walls extend continuously in vertical planes from said first orifice to said outlet and said other walls comprise flat top and bottom which extend continuously from said first to said second orifice.

* * * * *

UNITED STATES PATENT OFFICE
CERTIFICATE OF CORRECTION

PATENT NO. : 4,022,385
DATED : May 10, 1977
INVENTOR(S) : Robert A. KRUEGER

It is certified that error appears in the above-identified patent and that said Letters Patent are hereby corrected as shown below:

Column 8, Line 17   Cancel "said" (second occurrence) and insert in place thereof -- side --

Column 8, Line 20   After "bottom" insert -- walls --

Signed and Sealed this twelfth Day of July 1977

[SEAL]

Attest:

RUTH C. MASON
Attesting Officer

C. MARSHALL DANN
Commissioner of Patents and Trademarks